United States Patent [19]

Giannuzzi et al.

[11] 3,911,424

[45] Oct. 7, 1975

[54] ALPHANUMERIC CHARACTER DISPLAY SCHEME FOR PROGRAMMABLE ELECTRONIC CALCULATORS

[75] Inventors: Robert J. Giannuzzi, Endwell, N.Y.; Glen G. Langdon, Jr., San Jose, Calif.; Edward Pasternak, Binghamton, N.Y.

[73] Assignee: International Business Machines Corporation, Armonk, N.Y.

[22] Filed: Sept. 5, 1974

[21] Appl. No.: 503,418

[52] U.S. Cl. .......... 340/324 R; 235/156; 340/172.5; 340/337; 340/365 R

[51] Int. Cl.² .......... G08B 3/14

[58] Field of Search .... 340/337, 336, 365 R, 365 S, 340/324 R, 172.5; 235/156

[56] References Cited

UNITED STATES PATENTS

| | | | |
|---|---|---|---|
| 2,476,257 | 7/1949 | Hoff | 340/365 R |
| 3,187,321 | 6/1965 | Kameny | 340/365 R |
| 3,248,703 | 4/1966 | Moore et al. | 340/172.5 |
| 3,533,076 | 10/1970 | Perkins et al. | 340/172.5 |
| 3,678,466 | 7/1972 | Spangler | 340/172.5 |
| 3,760,171 | 9/1973 | Wang et al. | 235/156 |
| 3,855,461 | 12/1974 | Stockwell | 235/156 |

*Primary Examiner*—David L. Trafton
*Attorney, Agent, or Firm*—John S. Gasper

[57] ABSTRACT

A keyboard operated programmable electronic calculator is provided with a light display and individual key lights for the numeric and function keys. A program is entered into storage by operation of the numeric and function keys when the calculator is activated to the program mode by a first control key. The program is read out of storage by operation of a second control key. Control logic under control of the calculator CPU operates the light display and the individual key lights in response to manual operation of the second control key to identify the program step and its program parameter for checking purposes.

9 Claims, 6 Drawing Figures

ALPHANUMERIC CHARACTER DISPLAY SCHEME FOR PROGRAMMABLE ELECTRONIC CALCULATORS

BACKGROUND OF THE INVENTION

1. Field of the Invention

This invention relates to programmable electronic calculators and particularly to programmable electronic calculators of the desk or hand held type.

2. Description of the Prior Art

Programmable electronic calculators of the desk or hand held type are well known. Entry of a program is generally done by manually keying in the sequence of operations which make up the program to be utilized by the calculator in the performance of calculations also keyed in. Manual key operations can be prone to operator error. Therefore, some checking of the program entered into storage is desirable before calculations are actually performed. Program checking is particularly needed if the program is lengthy involving several dozen sequential operations.

Present electronic calculators provide for checking the entered program by operation of a key which addresses and calls out successive positions of storage where the entered program is stored. A display device is operated to display a two digit number, which when mentally translated by the operator, represents the row and column positions of the operated key which represents the specific program functions in the storage location being called out. Since the operation is required to mentally translate the displayed digits to a keyboard matrix position, the program checking is quite slow and tedious and places high demand on the operator to be attentive and very careful thereby causing reduced operator efficiency and increasing chance of error in the checking process.

SUMMARY OF THE INVENTION

The present invention has for its general object to provide an improved keyboard operated programmable electronic calculator.

The present invention has as a specific object to provide an improved keyboard operated programmable electronic calculator in which operator checking of a key entered program can be quickly done with greater speed and reliability.

The present invention has for its further object also to provide an improved means for editing programs as part of the program checking in a keyboard operated programmable electronic calculator of the desk or hand held type.

The above, as well as other objects of this invention, are achieved by providing indicator means which operate to distinctly identify the individual key which corresponds to the specific step of a program as the program is sequentially read out of storage. Specifically, in accordance with this invention, each numeric and function key which is operable to enter a program into storage of the calculator keyboard is provided with a light element which lights up when the program step represented by the key is read from storage. Also at the same time, as a further feature of this invention, the display device is operated to indicate the step in the program being looked at. Thus, the operator can readily identify the numeric or function (algebraic, trigonometric, logarithmic, etc.) merely by visually observing which key lights up. This eliminates the need for the operator to mentally translate a matrix position number on the display device and to physically locate the corresponding key since the lighted key immediately identifies what parameter occupies the addressed program in storage. In addition, the simultaneous number in the display can be quickly checked against the prewritten program. The direct illumination of the keys and the display of the program step greatly speeds up the program checking operation and improves operator efficiency and reliability.

The foregoing and other objects, features and advantages of the invention will be apparent from the following more particular description of a preferred embodiment of the invention, as illustrated in the accompanying drawing.

DESCRIPTION OF THE PREFERRED EMBODIMENT

Figure 1:
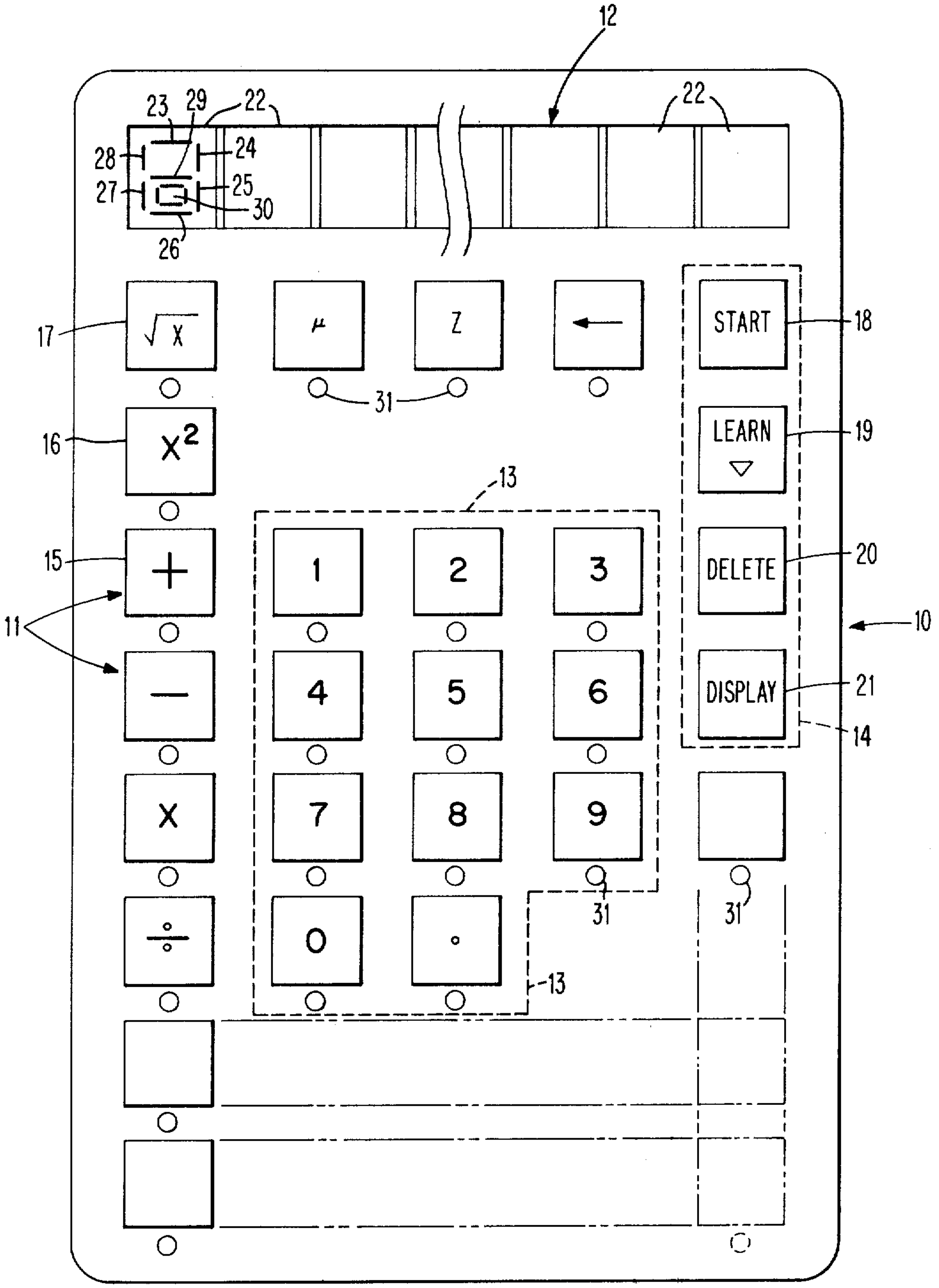
FIG. 1 is a plan view of a keyboard for a hand held type electronic calculator.
Figure 2:
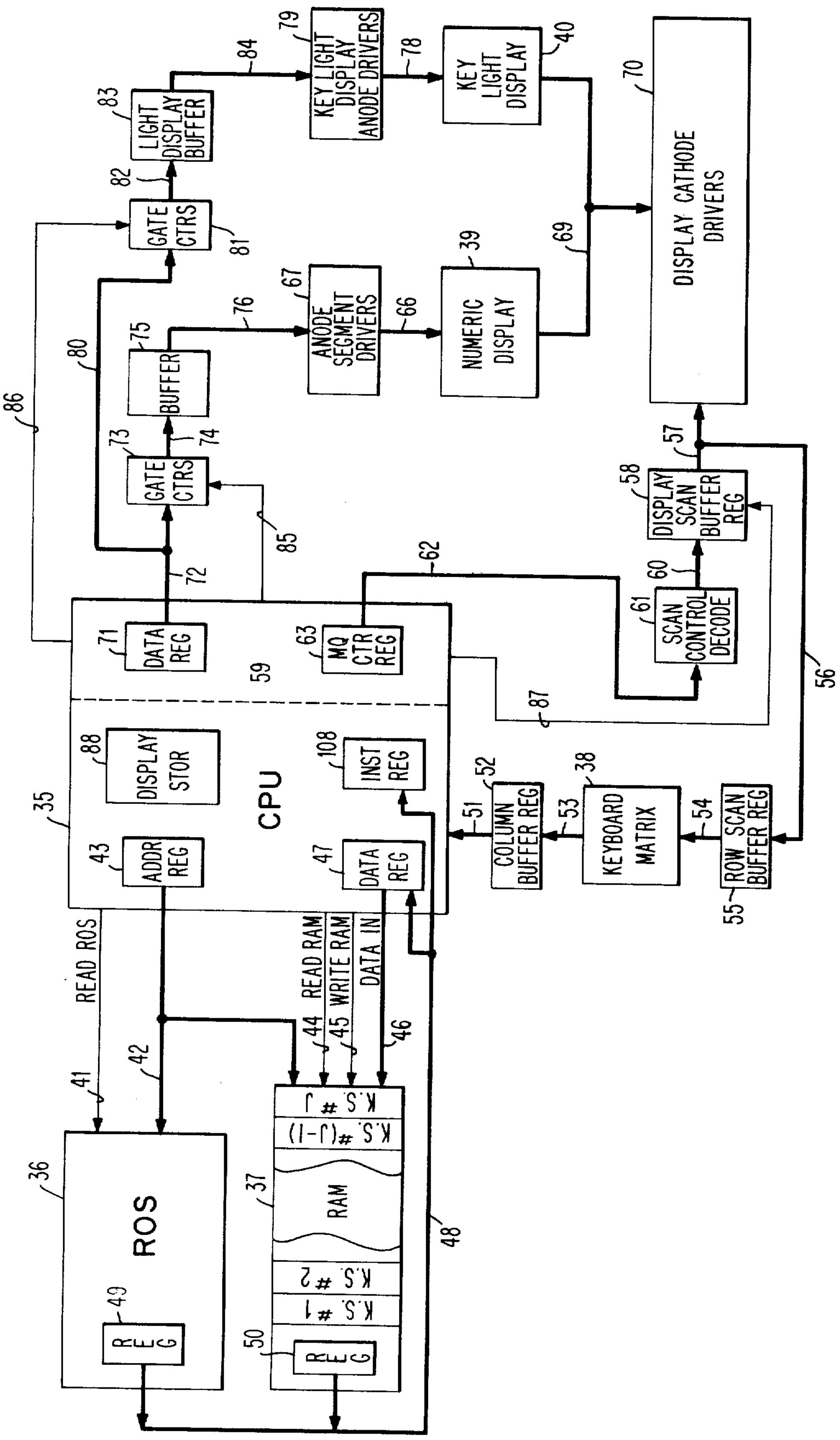
FIG. 2 is a logic circuit diagram of a programmable electronic calculator illustrating an overall configuration of the invention.

As seen in FIG. 1, a keyboard of an electronic calculator comprises a case 10, which houses a plurality of manually operated keys or buttons 11, a light emitting display device 12 and all the electronics assemblies for the circuits shown in FIG. 2. The keys 11 are arranged in a matrix and for convenience are identified in groups. For example, the numeric keys (which includes the decimal point key) are grouped in the center region of the keyboard identified by broken line 13. A group of control keys is located in the right column of the keyboard in the region identified by broken line 14. All the remaining keys such as 15, 16, 17 are referred to as function keys, each of which indicates to the calculator a function to be performed on numbers keyed into the storage of the calculator. Specific functions include add, subtract, multiply, divide, square, square root, and can further include trigonometric and logarithmic functions. The number and type of functions to be performed can be varied and no specific function or predetermined number of functions keys is required by this invention except that the present invention is considered especially useful in a calculator having a high number of functions, for example, 12. The control keys 14 include a START key 18, LEARN key 19, DELETE key 20, and DISPLAY key 21. The START key 18 turns power on and places the calculator in the calculate mode ready to receive input from the numeric and function keys. The LEARN key 19 is operated to initiate and terminate the programming of the computer. DISPLAY key 21 operates to read out a program in accordance with this invention in a manner to be more fully described hereinafter. The DELETE key 20 operates to make changes in a program when operated in conjunction with DISPLAY key 21.

The display 12 is made up of plural display cells 22 arranged in a horizontal row. There can be any number of display cells 22. The actual number would be dependent on desired capacity and performance of the calculator. Each display cell 22 is provided with light emitting diode (LED) segments 23 through 30 as seen only in the leftmost display cell 22. The segments 23 through 30 are arranged in well known manner to represent fragments of alphanumeric characters. Characters are displayed by energizing combinations of LED segments representing the character to be displayed. For example, the numeric 2 is displayed energizing LED segments 23, 24, 29, 27 and 26. The LED segment 30 when lighted in any cell 22 represents a decimal point.

As previously stated, it is a feature of this invention to provide a direct indication of the specific steps of the program keyed into storage when a program is being checked by operation of DISPLAY key 21. For this purpose, the keyboard case 10 is provided with plural key indicator lights 31 which when lighted identify the specific program parameter put into storage. An indicator light 31, which preferably is a light emitting diode (LED) as seen in FIG. 1, is located below every function key and every numeric key 13. When any indicator light 31 is turned on by the calculator in response to operation of the DISPLAY key 21, the energized indicator light 31 identifies to the operator the specific function or numeric represented by that key above it that is being checked in storage. Thus, the operator knows directly what program step occupies each position in a program being checked and no mental translation of a coordinate symbol on display device 12 is required. While the indicator lights 31 are shown as LED's and are located below their respective numeric and function keys, the indicator lights 31 could take other forms and could be located within the key structures themselves which would be transparent or translucent.

FIG. 2 illustrates the calculator system in block diagram format and comprises a central processing unit (CPU) 35, an external system control read only storage unit (ROS) 36, and an external random access memory (RAM) unit 37. The system further comprises a keyboard matrix 38, a numeric display device 39 and a key light display 40. The interconnection and operation of these basic system units will be described hereinafter.

CPU 35 is a programmed general purpose data processor of the well known type which includes sequence and control logic, an arithmetic and logic unit and memory devices for storing operational status parameters. For desk top or hand held calculators the CPU 35 might be integrated to minimize leads necessary for interconnecting the elements of the CPU and the I/O interfaces and to enable fast execution time. In the interest of brevity, the details of the calculator and other portions of the CPU 35 are not disclosed since the details of such processors are well known in the art and only those portions of the CPU directly relating to program checking and display are shown.

The read only storage (ROS) 36 is used in the system to store fixed subroutines or control programs. Included in the ROS 36 can be a set of keyboard and display routines operable during keyboard interactable system states.

Included in ROS are the keyboard matrix scan routines and numeric and function light display routines. The ROS 36 interfaces to the CPU 35 via READ ROS control line 41 and memory address bus 42 from a Memory Address Register 43 of the memory control portion of the CPU 35. As further detailed in FIG. 6, program steps from ROS 36 interface with CPU execution controls 59 to "drive" the system. A program word from ROS 36 on bus 48 is gated into Instruction Register 108 by control line 110. This program word is interconnected to CPU execution controls 59 via bus 109 and operated upon. Upon completion of execution of that instruction, CPU execution controls 59 generates the address of the next control word and buses it to address register 43 via bus 112.

The system RAM 37 contains the stored programs for performing the calculations keyed in from keyboard matrix 38. For purposes of this invention, the RAM 37 contains stored programs of $j$ addresses of $k$ bit encodings of key stroke sequences. RAM 37 interfaces with CPU 35 via READ RAM control line 44, WRITE RAM control line 45, Data IN bus 46 from Data Register 47 of the memory control portion of CPU 35, and memory address bus 42 from Memory Address Register 43. A Data Out Bus 48 connects both the output register 49 of ROS 36 and output register 50 of the RAM to the memory input portion of CPU 35.

The keyboard matrix 38 is essentially a switch matrix with a switch for each of the control, numeric, and function keys 11 of FIG. 1 arranged in column and row, preferably in accordance with the corresponding arrangement of the keys. The keyboard matrix 38 has an input interface with the CPU 35 via bus 51 coming from encode column buffer register 52 connected to the column bus 53 of keyboard matrix 38. The rows of the keyboard matrix 38 are connected via bus 54 to a row scan buffer register 55. Bus 56 connects keyboard row scan buffer 55 to bus 57 from display scan buffer 58 which is connected to the execution control portion 59 of CPU 35 via bus 60 display scan control decode 61 and bus 62 connected to MQ counter 63.

Figure 4:
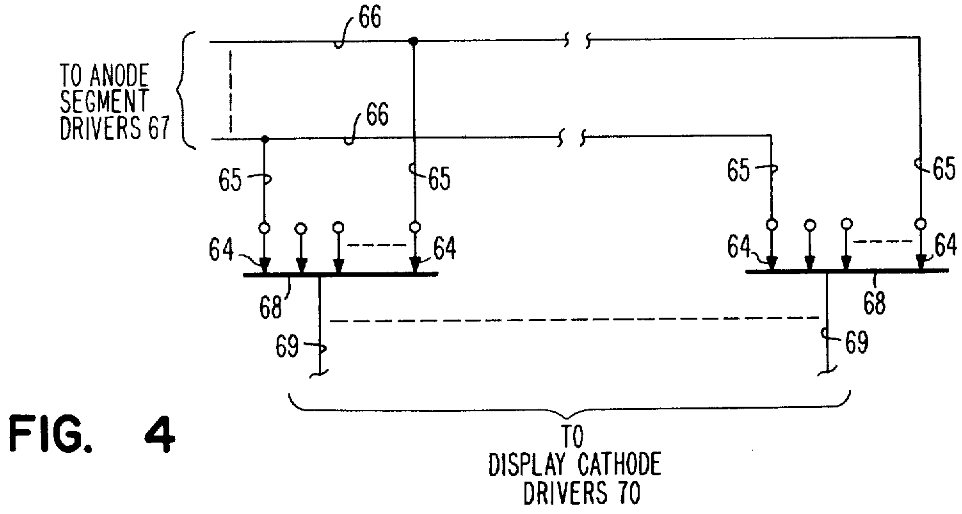
FIG. 4 is a circuit diagram of the display portion of FIG. 2.

The numeric display 39 comprises $i$ display positions of eight LED segments for selectivity forming numeric characters, each display position corresponding to a display cell 22 as seen in FIG. 1. As shown in FIG. 4, the LED segments comprise eight anodes 64 individually connected by conductors 65 through bus 66 to anode drivers 67. A common cathode 68 for each set of eight LED anodes 64 is connected via bus 69 to individual display position cathode drivers 70. The selection of anode drivers 64 of the $i$ display positions is controlled by display and execution control portion 59 of CPU 35 through data register 71 connected by bus 72 through gate circuits 73, bus 74, segment buffer 75 and bus 76.

Suppose a six digit number is to be displayed in a numeric segment display of eight positions. Here the first position is the sign, and one digit position is used to display the decimal point. The common numeric display position has one anode for each of seven segments and one for the decimal point. The number is displayed sequentially by positions; let MQ counter register 63 (see FIG. 6) mark the current digit position. Initialized with the MQ counter 63 cleared via reset line 107 from CPU execution controls 59, the stored program in ROS 36 fetches the sign using MQ counter 63 to address display storage 88 via path 102, and a read signal on control line 101 caused the sign segment code from display storage 88 to be placed in the accumulator 89 via bus 99 under gate control 114 to the Accumulator 89. The CPU is provided with a "Numeric Display" instruction whose execution is carried out in the following manner. The Accumulator 89 contains the segment code, and its contents are transferred on bus 97 to Data Register 71. Display number control signal line 85 is activated, which activates the anode segment drivers 67. The MQ counter 63 contents are transferred to Scan Control Decode 61 and Scan Buffer Register 58 and a load scan buffer control signal activates line 87. This causes only the cathode driver of the desired display position indicated by the MQ counter 63 to be activated, causing the combination of segments corresponding to the "on" bits of the Accumulator 89 to light up the LED segments in that digit position. The segments indicated by Data Register 71 will be lit in the position indicated by MQ Counter Register 63 until control signals on lines 85 or 87 become deactivated by control of a program in ROS 36. To display the next position in turn, the MQ Counter Register 63 is advanced by one via advance signal 104 and the next digit is fetched from display storage 88 and placed in the Accumulator 89 via bus 99.

Figure 5:
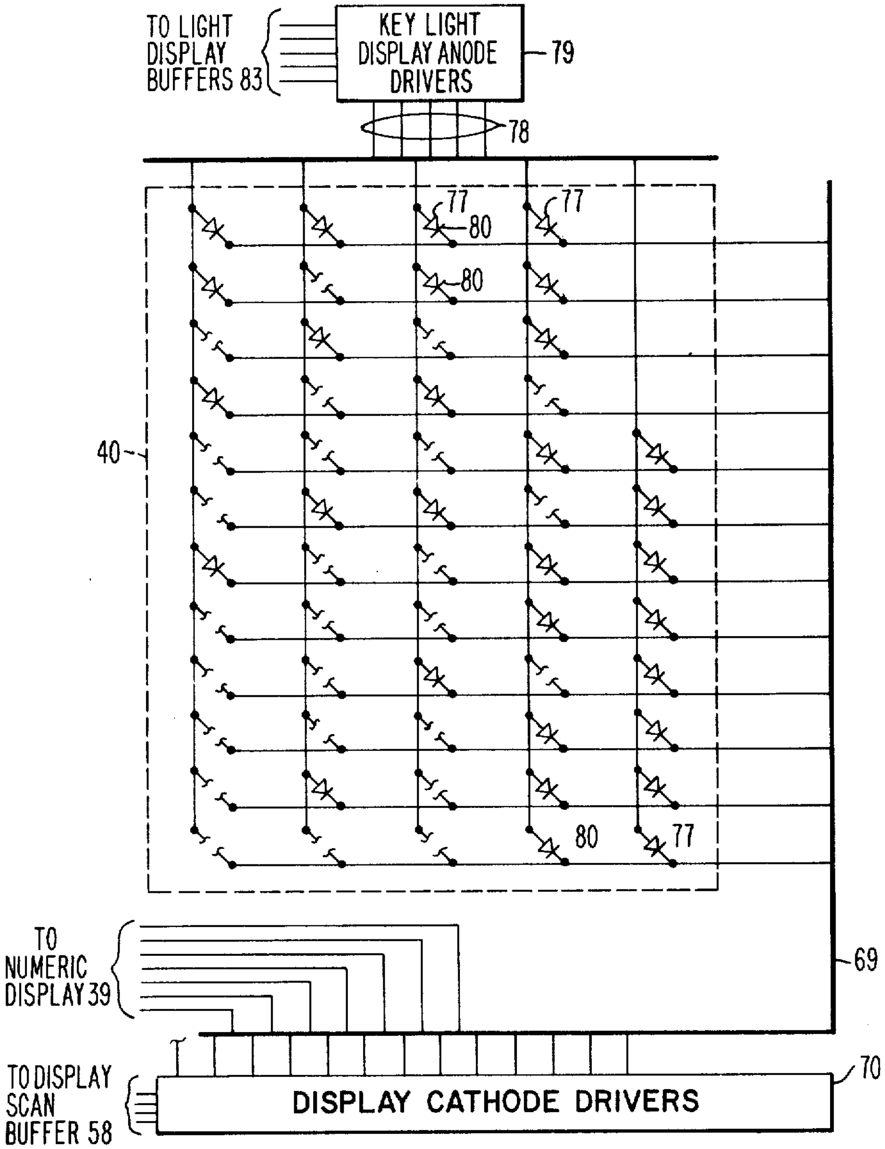
FIG. 5 is a circuit diagram of the key light display portion of FIG. 2.

The key light display 40 comprises plural LED lights 31 arranged on keyboard case 10 adjacent individual numeric and function keys 11 as previously described in connection with FIG. 1. Electrically the key lights of key light display 40 are arranged in a matrix configuration as shown in FIG. 5. The anodes 77 of individual LED's in a column are connected by a conductor of bus 78 to a common driver of the key light display anode drivers 79 while the cathodes 80 of the LED's in each row are connected by a common conductor of bus 69 to individual display cathode drivers 70. The selective operation of the anode drivers 79 is under control of display and execution control portion 59 of CPU 35 in which preselected bits from data register 71 are connected via bus 80 through gate circuits 81, bus 82, Light Display buffer 83, and bus 84. Gate signals on control lines 85 and 86 from display and execution control portion 59 of CPU 35 selectively sequence the operation of numeric display 39 and key light display 40. A gate signal on control line 87 from CPU 35 gates the contents of MQ counter 63 through Scan Control Decode 61 and Buffer Register 58 to sequentially scan the display cathode drivers 70 and the keyboard matrix 38 through row scan buffer 55.

Figure 6:
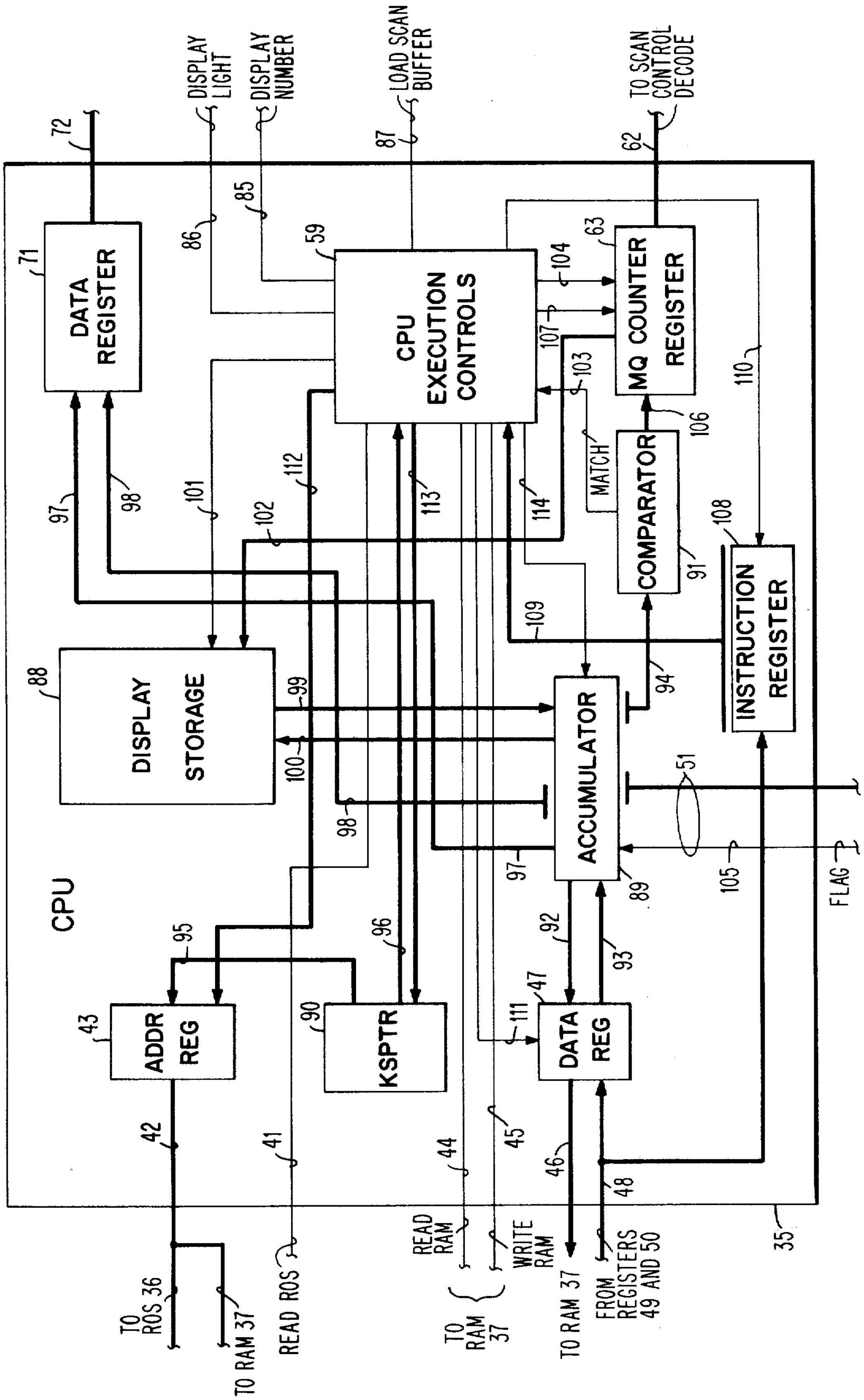
FIG. 6 is a more detailed logic diagram of a portion of the CPU associated with keyboard display and program storage.

To display a "Key" through the key light display 40, the Accumulator 89, as seen in FIG. 6, is assumed to have at least two fields (it may have more), a "row" field 94 and "column" field 98. The CPU is capable of executing a "DISPLAY KEY" instruction in the following manner. The MQ Register 63 indicates the "row" of interest. If the "row" field of the Accumulator 89 is not the same as the MQ Register 63, (as indicated by Comparator 91), the display remains unchanged, except the control line 85 for the numeric display is de-activated by CPU instruction execution controls 59. If the "row" field 94 of the Accumulator 89 equals the contents of the MQ Register 63, then the "column" field is transferred on bus 98 to Data Register 71 via bus 98. (Only one bit position will be "on.") Control signal 86 is activated, selecting a column anode driver of 79. As in the numeric display previously described, the contents of the MQ Register 63 are transferred to Scan Control Decode 61 and Scan Buffer Register 58 and control signal 87 is also activated. In the preferred embodiment, a program loop is employed where the MQ Register 63 is advanced by one via advance signal 104 for each successive execution of the loop.

As previously stated, the described electronics calculator is key programmable and has program read out capability for operator checking and editing. The programming, checking and editing will now be described. Initially, the operator presses the start key 18 on keyboard 10 (see FIG. 1) which turns on the calculator and places it in calculate mode. In this mode under control of CPU 35 the keyboard matrix 38 is constantly being scanned by the numeric and key light display scan routine from ROS 36. Depression of the LEARN key 19 (FIG. 1) operates a switch in the keyboard matrix 38 (FIG. 2) causing a keystroke encode signal input to CPU 35 from column buffer 52 on input bus 51. Depression of the learn control key toggles the system from the calculate to program mode. In program mode also, the keyboard matrix 38 is constantly being scanned by a routine from ROS 36.

Figure 3:
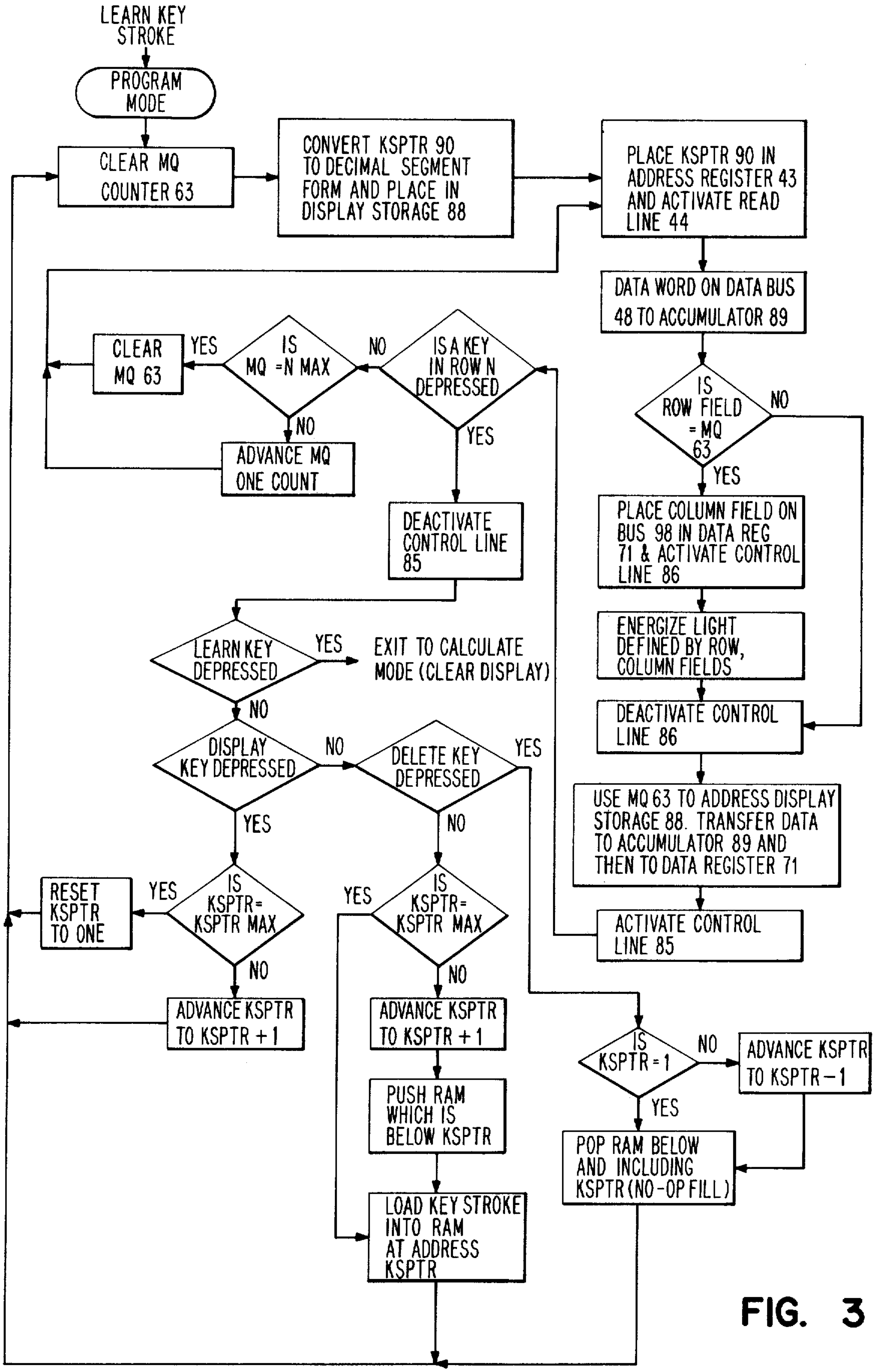
FIG. 3 is a flow chart illustrating the sequence of operations which drives the operation of this invention for the programmable electronics calculator of FIGS. 1 and 2.

When first entering program mode (see FIG. 3), counter MQ 63 of the CPU 35 is initialized to zero via reset line 107. KSPTR 90 is a CPU 35 register which keeps track of the current program step. It is displayed to the programmer, hence by a program it is converted to a decimal number and then by a table look-up technique, converted to the segment code, and placed in display storage 88 by path 100. KSPTR 90 is also used as a binary address by paths 95 and 42 to RAM 37 to retrieve the code of the current program step. Note that when the machine is turned on, RAM 37, a volatile memory, is loaded with null characters and KSPTR 90 is reset to zero by the power on/reset routine in ROS 36. Hence, for an "empty" RAM 37, a zero is displayed in the numeric display 12 and no function lights 31 are lit. The flowchart of FIG. 3 covers all occurrences in program mode. Therefore, any key depression other than control keys (DISPLAY, DELETE, LEARN, etc.) is entered into RAM 37 via the following hardware/ROS program actions. Read RAM signal on line 44 is activated by ROS program and data from RAM register 50 passes through paths 48 and 93 via data register 47 gated by selector control 111 to the Accumulator 89. Row field 94 is compared through comparator 91 to the MQ counter 63 and a control signal MATCH on line 103 controls the subsequent actions. If no MATCH signal occurs, then control signals 85 and 86 are deactivated (if they were set). If a MATCH signal occurs, then column field of Accumulator 89 on bus 98 is placed in Data Reg 71 for display, and control signal 86 is activated. The content of MQ counter 63 on bus 62 is decoded by scan control decode 61, then set into the scan buffer Register 58 via path 60 and under control of signal on line 87. This causes the proper key light to come on, as previously described regarding the key light display instruction. Next the program from ROS 36 uses MQ counter 63 to address display storage 88 via path 102, and a READ signal on control line 101 causes the digit position segment code from storage 88 to be placed in the Accumulator 89 via bus 99. This segment code is passed to Data Register 71, as previously described. By means of the Numeric Display instruction from ROS 36, the proper numeric digit position is lit by activating control line 85, and the key light is turned off by deactivating control line 86.

At this point, the row indicated by MQ 63 is scanned to see if a key has been depressed. Thus the output display function is intertwined with the keyboard input function. The Scan Buffer Register 58 output, through buses 56, 55 and 54, passes through keyboard matrix 38, whose output may or may not indicate a key depression. If it does, a FLAG signal on line 105 of bus 51 turns "on" the highest order bit of Accumulator 89 and the depressed key's column indication is placed in the Accumulator column field via path 51.

The CPU program from ROS 36 subsequently branches on the FLAG bit on line 105. If no key was depressed, MQ counter 63 is advanced via an ADVANCE signal on line 104, and the display loop, with the next row (and digit position), is re-entered. If a key was depressed, the display loop is exited, and the key is examined in order to determine the next action. Recall the key row and column code is now in the Accumulator, available for program branching. If the "LEARN" key 19 is depressed, then "program mode" is terminated, and the program branches to calculate mode. If the DISPLAY key 21 was depressed, then KSPTR 90 is sent via bus 96 to CPU execution controls 59 and advanced to the next program step (or returned to the first program step if the previous step was the last) and returned via bus 113, and the display loop is re-entered at the initialization point. The depression of the DELETE key 20 causes the current program step to be deleted; the rest of the program is shifted accordingly. The depression of a "Non-Control" key results in an insertion of the particular keystroke into the next program step. By CPU program means, the contents of RAM 37 are shifted up one position to make room for the new keystroke code, which is bused via selector control 111 from Accumulator 92 to Memory Data Register 47, before inserting it into its proper location, which is the previous KSPTR plus one. With KSPTR now pointed to the newly inserted keystroke, the program returns to the initialization point of the key light display routine. An exception is when KSPTR was already pointing to the last position of user program RAM 37. In this case, the last position is overwritten with the new keystroke and KSPTR 90 does not advance.

While the invention has been particularly shown and described with reference to a preferred embodiment thereof, it will be understood by those skilled in the art that various changes in form and details may be made therein without departing from the spirit and scope of the invention.

We claim:

1. A programmable calculator apparatus comprising in combination;
- character display means;
- key means including numeric, function and control keys,
  - said control keys including a display key operable for checking programs stored in said calculator;
- individual key indicator means for said numeric and function keys;
- storage means for storing coded representations of said numeric and function keys in a program sequence in response to successive operations of said numeric and function keys; and
- means for checking said coded representations of said numeric and function keys including
  - control means operable in response to repeated operations of said display key to selectively energize said key indicator means in the program sequence in which said numeric and function keys were operated and to display successive numeric indications of said program sequence on said character display means.

2. A programmable calculator apparatus in accordance with claim 1 in which said indicator means includes individual key lights located in proximity with said individual numeric and function keys.

3. A programmable calculator apparatus in accordance with claim 1 in which
- said character display means comprises segmented light emitting elements, and
- said key lights comprise individual light emitting elements located in proximity with said individual numeric and function keys.

4. A programmable calculator apparatus in accordance with claim 3 in which
- said control means of said checking means further comprises common means for selectively energizing said segmented light emitting elements and said individual indicator light emitting elements.

5. A programmable calculator apparatus in accordance with claim 4 in which
- said segmented light emitting elements of said character display means and said light emitting elements of said indicator means are light emitting diodes;
- and said control means includes driver means for selectively energizing various combinations of said segmented light emitting means to display numeric indications of said program sequence on said character display means and for selectively energizing individual key lights in accordance with the operation of said numeric and function keys in said program sequence.

6. A programmable calculator apparatus in accordance with claim 5 in which
- said segmented light emitting elements are light emitting diodes,
- said key lights are individual light emitting diodes, and
- said driver means comprises
  - first anode drivers for said light emitting diodes of said character display means,
  - second anode drivers for said light emitting diodes of said key lights,
  - cathode drivers for said light emitting diodes of said character display and the light emitting diodes of said key lights; and
- display control means responsive to coded representations of said numeric and function keys for selectively activating said first and second anode drivers and cathode drivers.

7. A programmable calculator apparatus comprising in combination;
- character display means;
- key means including numeric, function and control keys,
  - said control keys including a display key operable for checking programs stored in said calculator;
- individual key indicator means for said numeric and function keys;

storage means for storing coded representations of said numeric and function keys in a program sequence in response to successive operations of said numeric and function keys; and means for checking said coded representations of said numeric and function keys including control means operable in reponse to repeated operations of said display key to selectively activate said indicator means in the program sequence in which said numeric and function keys were operated.

8. A programmable calculator apparatus in accordance with claim 7 in which said key indicator means are individual key light elements located proximate said individual numeric and function keys, and said control means is operable to selectively energize said key light elements in the program sequence in which said numeric and function keys were operated.

9. A programmable calculator apparatus in accordance with claim 8 in which said key light elements are light emitting diodes located proximate said individual numeric and function keys and said control means comprises anode and cathode driver means selectively operable in response to coded representations of said numeric function keys for selectively energizing said light emitting diodes in accordance with said program sequence.

* * * * *